(12) United States Patent
Haugen

(10) Patent No.: US 7,861,525 B2
(45) Date of Patent: Jan. 4, 2011

(54) DUAL VOLUTE TURBOCHARGER

(75) Inventor: David James Haugen, Ann Arbor, MI (US)

(73) Assignee: The United States of America as represented by the Administrator of the U.S. Environmental Protection Agency, Washington, DC (US)

( * ) Notice: Subject to any disclaimer, the term of this patent is extended or adjusted under 35 U.S.C. 154(b) by 298 days.

(21) Appl. No.: 12/156,601

(22) Filed: Jun. 3, 2008

(65) Prior Publication Data

US 2009/0060719 A1 Mar. 5, 2009

Related U.S. Application Data

(62) Division of application No. 11/174,391, filed on Jul. 1, 2005, now Pat. No. 7,644,585.

(60) Provisional application No. 60/605,898, filed on Aug. 31, 2004.

(51) Int. Cl.
*F02B 33/44* (2006.01)
*F02B 33/00* (2006.01)
*F02D 23/00* (2006.01)
*F01D 1/02* (2006.01)
*F01D 9/00* (2006.01)
*F04D 29/44* (2006.01)
*F04D 29/54* (2006.01)

(52) U.S. Cl. .......................... 60/612; 60/602; 123/562; 415/204; 415/205

(58) Field of Classification Search .............. 60/602, 60/612, 614, 624; 123/562; 415/158–164, 415/204–205; 407/406–407
See application file for complete search history.

(56) References Cited

U.S. PATENT DOCUMENTS

| | | | | |
|---|---|---|---|---|
| 3,442,493 A | * | 5/1969 | Smith, Jr. ................... | 415/161 |
| 3,930,747 A | * | 1/1976 | Woollenweber ............ | 415/205 |
| 4,291,535 A | | 9/1981 | Goloff ........................ | 60/602 |
| 4,391,098 A | * | 7/1983 | Kosuge ...................... | 60/624 |
| 4,705,452 A | * | 11/1987 | Karadimas ................. | 415/161 |
| 4,982,567 A | * | 1/1991 | Hashimoto et al. ........ | 60/612 |
| 5,092,126 A | | 3/1992 | Yano ........................... | 60/602 |
| 5,372,485 A | * | 12/1994 | Sumser et al. ............. | 415/166 |
| 5,520,511 A | * | 5/1996 | Loudet et al. .............. | 415/161 |
| 6,360,732 B1 | * | 3/2002 | Bailey et al. ............... | 60/612 |
| 6,378,305 B1 | * | 4/2002 | Sumser et al. ............. | 60/602 |
| 6,378,308 B1 | * | 4/2002 | Pfluger ....................... | 60/612 |
| 6,412,279 B1 | * | 7/2002 | Coleman et al. ........... | 60/612 |
| 6,672,061 B2 | * | 1/2004 | Schmid et al. ............. | 60/602 |
| 6,694,735 B2 | * | 2/2004 | Sumser et al. ............. | 60/605.2 |
| 6,715,288 B1 | * | 4/2004 | Engels et al. .............. | 60/602 |
| 7,363,761 B1 | * | 4/2008 | Dickerson .................. | 60/602 |
| 7,426,831 B2 | * | 9/2008 | Grissom ..................... | 60/612 |
| 7,540,150 B2 | * | 6/2009 | Schmid et al. ............. | 60/612 |
| 2008/0223039 A1 | * | 9/2008 | Sumser et al. ............. | 60/612 |
| 2009/0000296 A1 | * | 1/2009 | Pierpont et al. ............ | 60/602 |
| 2010/0083656 A1 | * | 4/2010 | Parlow et al. .............. | 60/612 |

FOREIGN PATENT DOCUMENTS

AT 410697 B * 5/2003
JP 2003120302 A * 4/2003

* cited by examiner

*Primary Examiner*—Thai Ba Trieu
(74) *Attorney, Agent, or Firm*—David H. Read

(57) ABSTRACT

A two-volute low pressure turbocharger is provided with a VGT mechanism in one turbine volute only.

12 Claims, 15 Drawing Sheets ered multi-stage turbocharging system for internal com-
DUAL VOLUTE TURBOCHARGER

CROSS-REFERENCE TO RELATED APPLICATION

This application is a divisional of U.S. application Ser. No. 11/174,391, "Multi-Stage Turbocharging System with Efficient Bypass," filed Jul. 1, 2005, now U.S. Pat. No. 7,644,585 which claims priority from U.S. Provisional Patent Application No. 60/605,898, filed Aug. 31, 2004. These above-mentioned applications are incorporated herein by reference in their entirety.

BACKGROUND OF THE INVENTION

1. Field of the Invention

This invention relates to turbocharging systems for internal combustion engine systems.

2. Description of the Related Art

Turbocharging systems, such as for use with internal combustion engines, are well-known in the art. A turbocharger comprises an exhaust gas turbine coupled to a gas intake charge compressor. The turbine operates by receiving exhaust gas from an internal combustion engine and converting a portion of the energy in that exhaust gas stream into mechanical energy by passing the exhaust stream over blades of a turbine wheel, and thereby causing the turbine wheel to rotate. This rotational force is then utilized by a compressor, coupled by a shaft to the turbine wheel, to compress a quantity of air to a pressure higher than the surrounding atmosphere, which then provides an increased amount of air available to be drawn into the internal combustion engine cylinders during the engine's intake stroke. The additional compressed air (boost) taken into the cylinders can allow more fuel to be burned within the cylinder, and thereby offers the opportunity to increase the engine's power output.

In a turbocharged internal combustion engine system, the wide range of speed and power output levels at which the internal combustion engine may operate presents challenges for designing an appropriately matched turbocharging system with good mechanical efficiency for working with the engine. For example, while smaller turbochargers provide boost quickly and more efficiently at lower engine speeds, larger turbochargers provide boost more effectively at higher engine speeds. Because of the relatively narrow flow range over which a turbocharger operates efficiently, relative to the broader flow range generated by internal combustion engines, it is known in the prior art (e.g., in cases of high boost need), to provide a multi-stage turbocharging system, involving both a smaller (i.e. "high pressure") turbocharger and a larger (i.e. "low pressure") turbocharger, wherein the smaller high pressure turbocharger operates at lower engine speeds and the larger low pressure turbocharger takes over at higher engine speeds. It has been found valuable to switch between the two turbocharging stages through use of a bypass system to divert exhaust gas flow around the higher pressure turbocharger to the lower pressure turbocharger as needed.

As a result, bypassing exhaust flow around a turbine gas expander is also well-known in the art. Typically, turbine bypass systems are used in the prior art primarily to regulate system pressure across the higher stage turbine wheel, and can be operated by selectively bleeding off a portion of the upstream exhaust gas over a pressure drop through a bypass channel when backpressure caused by the turbine's operation causes the system pressure upstream of the turbine to exceed desired levels. Bleeding of the exhaust gas through the bypass channel is generally controlled by a small regulating valve (called a "wastegate") in the exhaust piping channel around the turbine. A typical wastegate valve operates somewhat like a trap door, opening a port from the higher pressure turbine inlet to a lower pressure area by diverting a portion of the exhaust flow through a bypass channel around the turbine, with the bypassed exhaust flow naturally expanding over the pressure drop in the bypass channel and then reuniting with the remaining exhaust flow downstream of the bypassed turbine.

OBJECT OF THE INVENTION

An object of the present invention is to provide a more efficient multi-stage (i.e., with two or more stages) turbocharging system for internal combustion engine systems.

In furtherance of the object of this invention, it has been recognized that prior art wastegate and bypass mechanisms are a source of unnecessary loss of useful energy in prior art multi-stage turbocharging systems. Therefore, a further object of the present invention is to provide an efficient means for preserving, capturing, utilizing, and/or reducing the amount of energy otherwise lost in bypassing between stages in multi-stage turbocharging systems, in order to further improve the efficiency of internal combustion engine systems utilizing multi-stage turbocharging systems.

SUMMARY OF THE INVENTION

The present invention reduces the unrecovered loss of exhaust gas energy that otherwise occurs in bypassing exhaust flow from one stage to another in a conventional multi-stage turbocharging system. The preferred method of preserving such exhaust energy is through converting a portion of the exhaust energy of the bypassed flow from pressure to velocity by passing the bypassed flow, while substantially still at the higher exhaust energy level present upstream of the bypassed turbine, through a variable geometry valve/nozzle, turbine VGT vanes, or other reduced cross-sectional area nozzle, and then not allowing the accelerated flow to substantially lose that increased recoverable kinetic energy before reaching the subsequent stage's turbine wheel. This may be done, for example, through placing the variable geometry valve or VGT vane outlet adjacent to the lower pressure turbine wheel's blades (or sufficiently nearby such blades to avoid substantial dissipation of the increased acceleration/ momentum effect), and at an appropriate incidence angle to the lower pressure turbine wheel's blades. The increased momentum resulting from accelerating the flow may then be imparted to the lower pressure turbine's wheel, and thereby allow converting the energy to a mechanical rotational force as is known in the art. Alternative means and preferred turbocharging hardware embodiments for efficiently preserving or capturing energy lost between stages in a multi-stage turbocharging system are also discussed. This system may be utilized between stages with internal combustion engine or other multi-stage turbine systems encompassing three or four (or more) stage systems as well.

BRIEF DESCRIPTION OF THE DRAWINGS

In the drawings, identical reference numbers identify similar elements or acts. The sizes and relative positions of elements in the drawings are not necessarily drawn to scale.

DETAILED DESCRIPTION OF THE INVENTION

Figure 1:
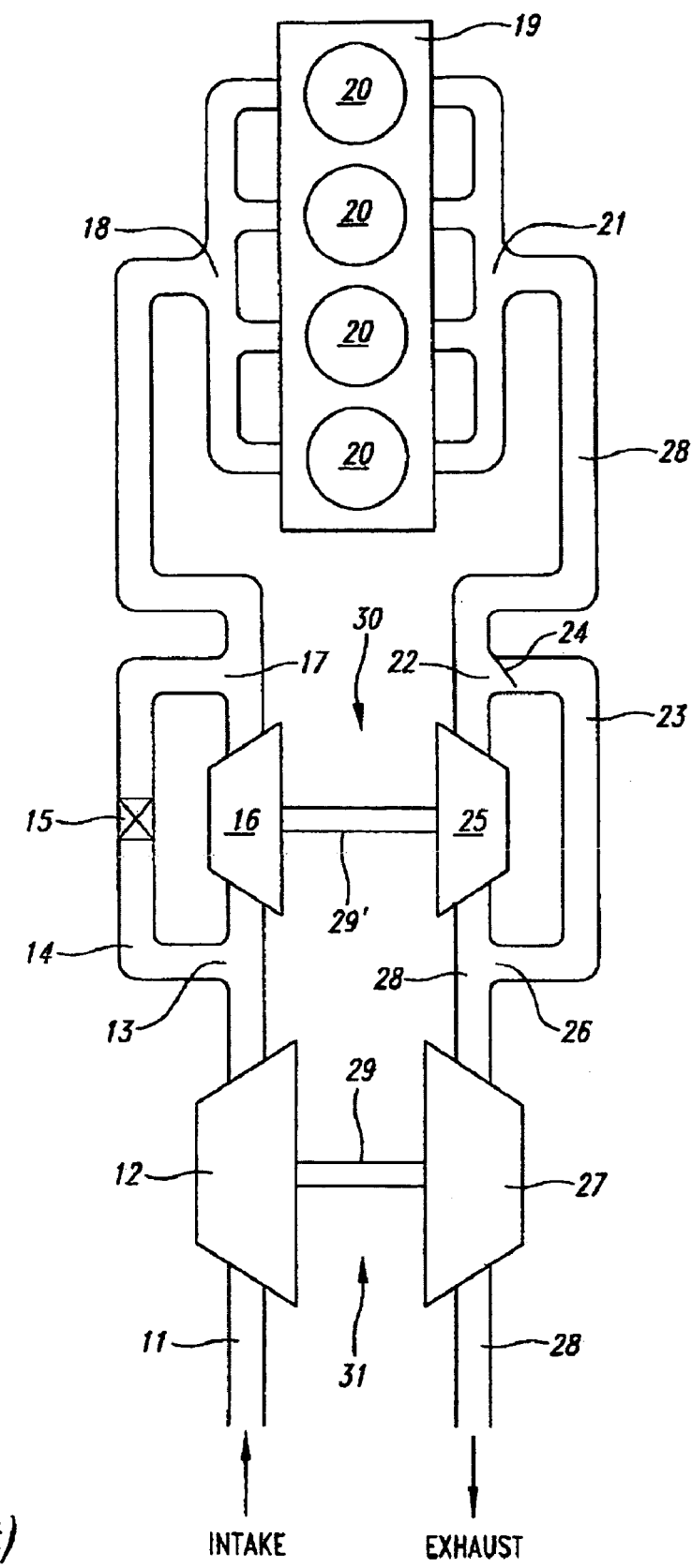
FIG. 1 is a schematic diagram of an internal combustion engine system with a prior art multi-stage turbocharging system.

FIG. 1 shows an internal combustion engine system with a multi-stage turbocharging and bypass system from the prior art. Referring to FIG. 1, ambient air enters the system through intake line 11. The intake air may optionally be mixed with recirculated exhaust gas (EGR) to form a charge-air mixture. The ambient air or EGR/ambient air mixture ("charge-air") mixture flows through and is compressed by a first-stage low pressure air compressor 12.

After compression in compressor 12, the intake air may flow through a second-stage high pressure air compressor 16 for further compression. Alternatively, the intake air may be diverted at port 13 to optional bypass channel 14 and return to the intake line at port 17, as regulated by the opening or closing of optional bypass valve 15.

Intake air then enters the intake manifold 18 and into combustion chambers 20 of engine 19 through conventional valves (not shown) in a conventional manner. Following combustion in the combustion chambers 20, the warm, pressurized exhaust gases leave the combustion chambers 20, at a first, higher, exhaust gas energy level, through conventional valves (not shown) in a conventional manner, and flow from engine 19 through exhaust manifold 21 to exhaust line 28.

After leaving the exhaust manifold 21, exhaust gas in exhaust line 28 may flow through a high pressure turbine gas expander 25. High pressure turbine gas expander 25 in exhaust line 28 is coupled to the high pressure air compressor 16 in the intake line 11 through shaft 29', and together the combined expander and compressor device forms a high pressure turbocharger 30. Alternatively to flowing through high pressure turbine 25, a portion of the exhaust gas may be selectively diverted at port 22 to bypass channel 23 and return to the exhaust line at port 26, as regulated by opening or closing of port 22 through operation of wastegate valve 24, which is operated (actively or passively) to open in response to system pressure buildup upstream of turbine 25. Wastegate valve 24 may be located anywhere within bypass channel 23. It should be noted that even though the wastegated exhaust gas does not pass through turbine expander 25, the pressure difference between the bypassed exhaust gas flow and the exhaust gas that has passed through turbine expander 25 is lost to natural expansion and dissipation of any increased velocity of the bypassed exhaust gas, either in bypass channel 23 or upon reuniting with the lower pressure exhaust flow in exhaust line 28 at port 26.

Downstream of turbine gas expander 25, the exhaust gas at this second, lower, exhaust gas energy level may then flow through low pressure turbine gas expander 27 for further expansion, and then exit the system through exhaust line 28. It should also be noted for FIG. 1 that turbine gas expander 27 in exhaust line 28 is coupled to low pressure air compressor 12 in intake line 11 through shaft 29, and together the expander 27 and compressor 12 integrated device form a low pressure turbocharger 31.

Figure 2:
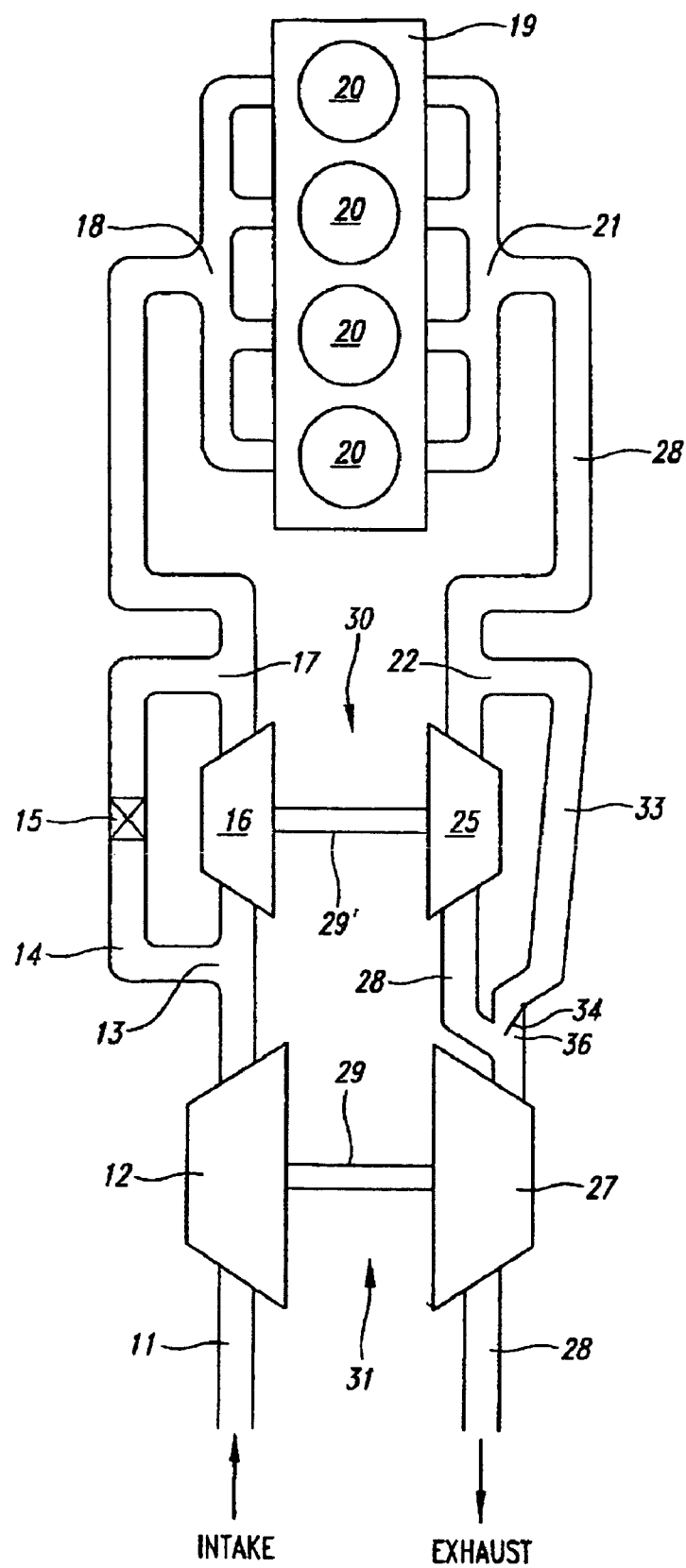
FIG. 2 is a schematic diagram of an internal combustion engine system with a first turbocharging and bypass arrangement of the present invention.

FIG. 2 presents a first improvement on the prior art multi-stage turbocharged internal combustion engine system of FIG. 1, as one embodiment operating in accordance with principles of the present invention. For ease of discussion in highlighting aspects of this embodiment of the invention over the prior art, the embodiment of FIG. 2 is presented herein as identical to FIG. 1 of the prior art in all respects (i.e., with identical components, numeration, system configuration and operation), except as hereafter described.

Referring to FIG. 2 in comparison to the FIG. 1 prior art, it will be noted that certain changes from the prior art have been made with relation to the bypass system around high pressure turbine 25. Like valve 24 of FIG. 1, valve 34 of FIG. 2 regulates (e.g. through a pressure differential) the quantity of exhaust gas diverted from exhaust fine 28 through bypass means channel 33 to port 36. However, in FIG. 2, valve 34 and return port 36 are geometrically configured closer to, and at a more complementary angle for direction of the bypass flow toward the inlet of turbine 27.

These changes in FIG. 2 are made in recognition that a portion of the energy in the bypassed exhaust gas that is diverted through bypass channel 33 is converted from pressure to kinetic energy (velocity) at valve 34 by passing the bypassed flow through valve 34, with valve 34 acting as a reduced cross-sectional area nozzle. Valve/nozzle 34 therefore acts in FIG. 2 as a nozzle when in an open position, by providing a reduced cross-sectional area flow path for the bypassed exhaust gas. As an example, valve/nozzle 34 may open to form a flow path in the shape of a short tube with a taper or constriction (reduced cross-section) designed to speed up (and preferably also direct) the flow of exhaust gas. As will be known in the art, there are many known alternative structures that may also perform this similar "nozzle" function of speeding up the flow of a gas or fluid, which are also intended to be encompassed within this patent's use of the terms "nozzle" or "nozzle means" herein.

The accelerated flow exiting valve/nozzle 34 is there reunited at intersection point 36 with the flow in exhaust line 28 (or directly at an inlet to turbine 27), preferably in an orientation resulting in an optimal combined direction for the exhaust flows just prior to, and at an appropriate incidence angle to, the turbine wheel blades of turbine 27, as will be known in the art. The accelerated flow is there converted, combined with the exhaust flow in exhaust line 28, to a mechanical rotational force by turbine 27. By locating port 36 sufficiently near the turbine wheel blades of turbine 27, the accelerated flow is not allowed to substantially dissipate energy before reaching the turbine wheel of turbine 27 for work extraction. Regarding selection of acceptable distances between valve/nozzle 34 and the turbine wheel, it will be understood that the closer the distance will result in greater recovery of energy, and that through experimentation the distance can be increased until such point that the increase in recovery of energy from the bypass acceleration is no longer measurable with normal state of the art sensors and thus would no longer fall within the scope of this invention.

Thus, in FIG. 2, bypass means 33 and valve/nozzle 34 provide bypassing of pressurized exhaust gas from the engine around the high pressure turbine to an inlet of the lower pressure stage turbine in this embodiment, by leaving the bypassed flow in a complementary flowing direction with the main exhaust flow just prior to the turbine wheel blades of turbine 27, regardless of (and thus it is irrelevant for this particular embodiment) whether port 36 lies as a direct inlet to turbine 27 or as a substantially equivalent return port to exhaust line 28 just prior to turbine 27.

Figure 3:
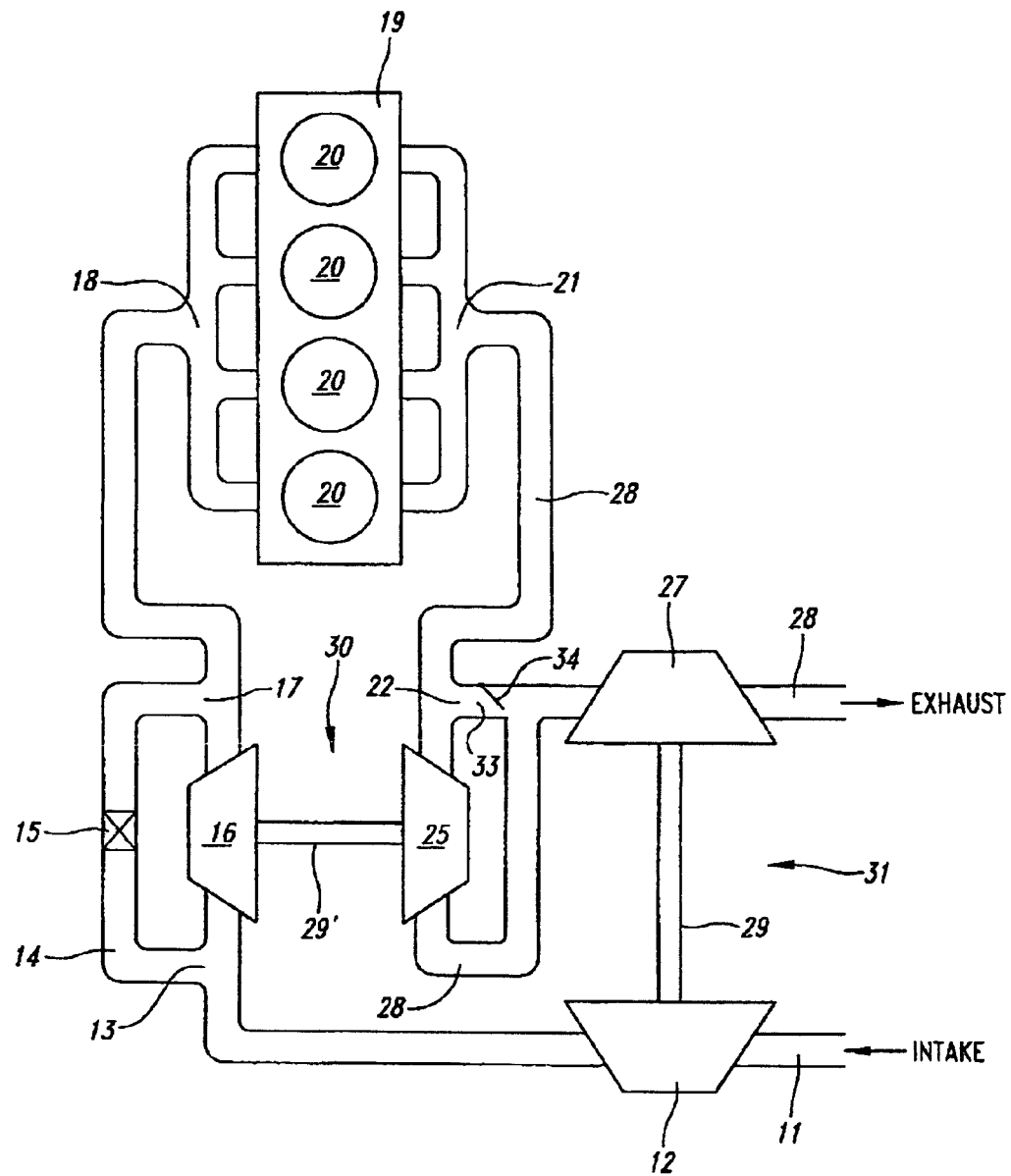
FIG. 3 is a schematic diagram of an internal combustion engine system with a second, alternative bypass arrangement of the present invention.

FIG. 3 presents the same embodiment as FIG. 2, but illustrating that the length of the bypass route 33 is irrelevant and may be substantially eliminated, if desired. In addition, for either FIG. 2 or 3, the bypass route may optionally begin directly from exhaust manifold 21 instead of exhaust line 28, if desired, such as is illustrated in FIG. 5 (discussed below).

Figure 4:
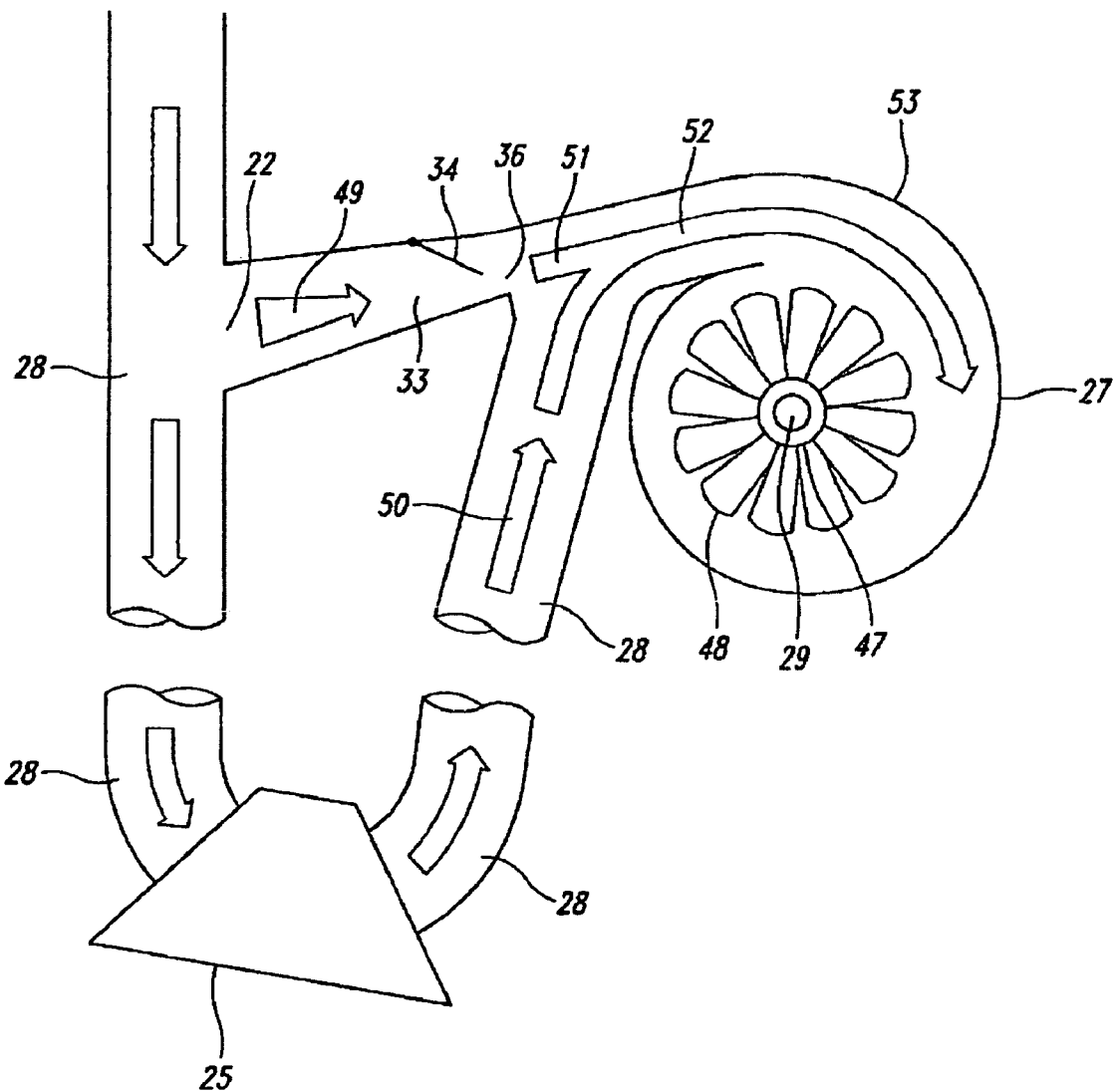
FIG. 4 is a more detailed view of the turbocharging and bypass arrangement of the system shown in FIG. 3.

FIG. 4 illustrates in more detail one embodiment of reuniting of the accelerated bypass flow with the main exhaust flow prior to and at an appropriate incidence angle to the turbine wheel blades of turbine 27 as discussed for FIGS. 2 and 3 above. As shown in FIG. 4, bypass exhaust flow 49 in bypass route 33 passes through valve 34 in a reduced cross section (nozzle) area of bypass route 33 and/or port 36, which produces an accelerated bypass exhaust flow 51. Other "nozzle means" for accelerating the bypass exhaust flow may alternatively be used, as is known in the art. Accelerated bypass exhaust flow 51 then combines with the lower velocity main exhaust flow 50 in exhaust line 28 (or, alternatively, within the turbine 27 itself), forming combined exhaust flow 52. Combined exhaust flow 52 preferably shortly thereafter hits the turbine blades 48 at a desired angle to cause turbine wheel 47 to spin, as is known in the art. Note, however, that it is not necessary for the bypass flow to reunite with the main exhaust flow prior to impact with the lower pressure turbine's wheel blades for the energy to be recovered.

Figure 5:
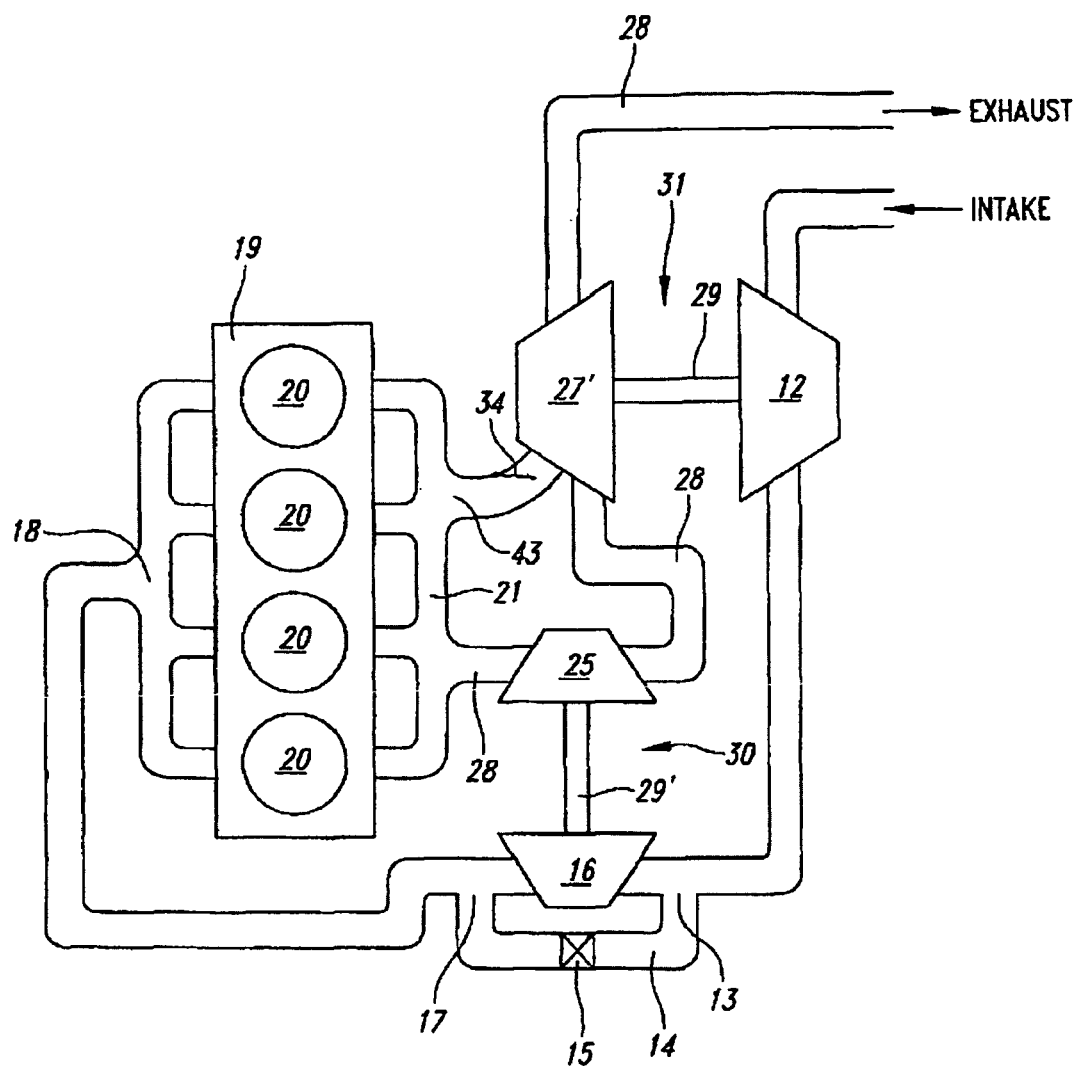
FIG. 5 is a schematic diagram of an internal combustion engine system with another alternative turbocharging and bypass arrangement of the present invention.
Figure 10:
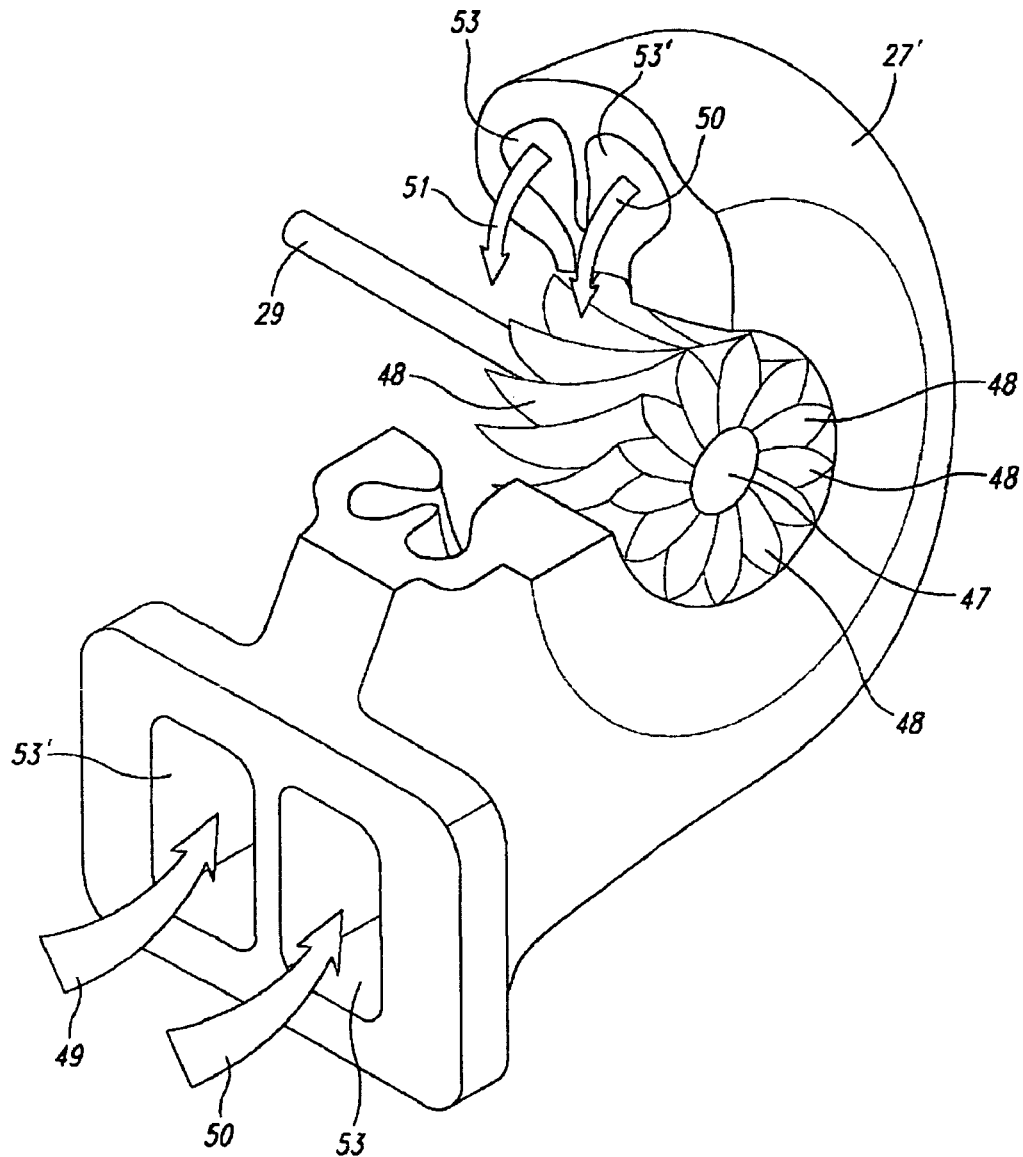
FIG. 10 presents a cut-away view of a two-volute turbine in a side-by-side orientation, such as for use in the preferred embodiment of FIGS. 9A and 9B of the invention.

FIG. 5 presents an alternative embodiment, with bypass route 43 connected directly to exhaust manifold 21, instead of to exhaust line 28. In this manner, for each of these embodiments, it will be understood that bypass means 43 may be shortened to be no more than a direct fluid connection between exhaust manifold 21 and an inlet to low pressure turbine 27. In addition, returning to FIG. 5, in FIG. 5 a two-volute turbine 27' (e.g. FIG. 10) replaces turbine 27, with one volute 53 of turbine 27' receiving lower velocity and energy exhaust from exhaust line 28 downstream of high pressure turbine 25, and the other volute 53' of turbine 27' receiving the higher energy and velocity (accelerated) bypassed exhaust directly from exhaust manifold 21 (without being reunited with other exhaust gas prior to impact with the lower pressure turbine's wheel blades). Although the two-volute turbine 27' is at times referred to herein as a "dual volute" turbine, such reference does not mean that volutes 53 and 53' of turbine 27' are necessarily the same size. Two-volute turbines such as turbine 27' are known in the art, although more commonly with volutes of the same size, such as for use with divided exhaust manifolds. FIG. 10 presents a cut-away view of a sample two-volute turbine 27'. It will also be understood that the flows from the two volutes of turbine 27' may be coordinated in various ways with regard to the targeting of the respective flows toward the blades of the turbine wheel, if desired.

For FIGS. 2 through 5 above, it has already been discussed that valve 34 in the bypass route may function in the present invention as both (i) a regulating valve to control bypass flow, and (ii) as a nozzle that converts a portion of the exhaust energy of the bypassed flow from pressure to kinetic energy (in the form of increased velocity of the bypassed exhaust flow). Given the wide range of exhaust flows generated in internal combustion engines that operate under wide ranges of engine speed and load conditions, it is preferable with the present invention to utilize a valve/nozzle means with variable geometry capability in accelerating the bypassed exhaust flow, to extend the system's benefits and effectiveness over a wider range of engine operation.

Figure 6A:
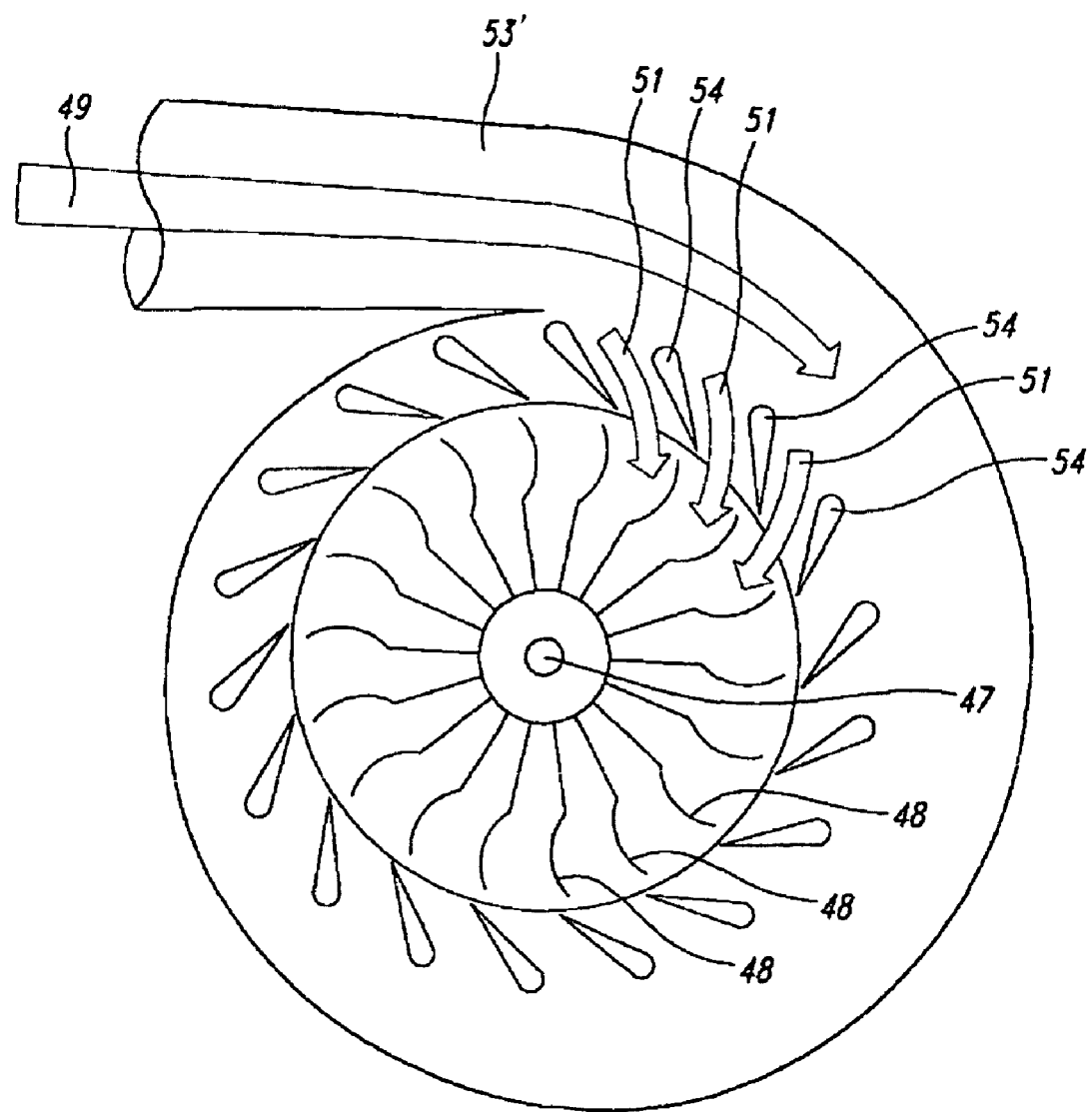
FIG. 6A presents a preferred variable geometry valve/nozzle means for use with a two-volute low pressure turbine, with the valve/nozzle means being VGT vanes, shown in an open position, in a second volute of a two-volute low pressure turbine.
Figure 6B:
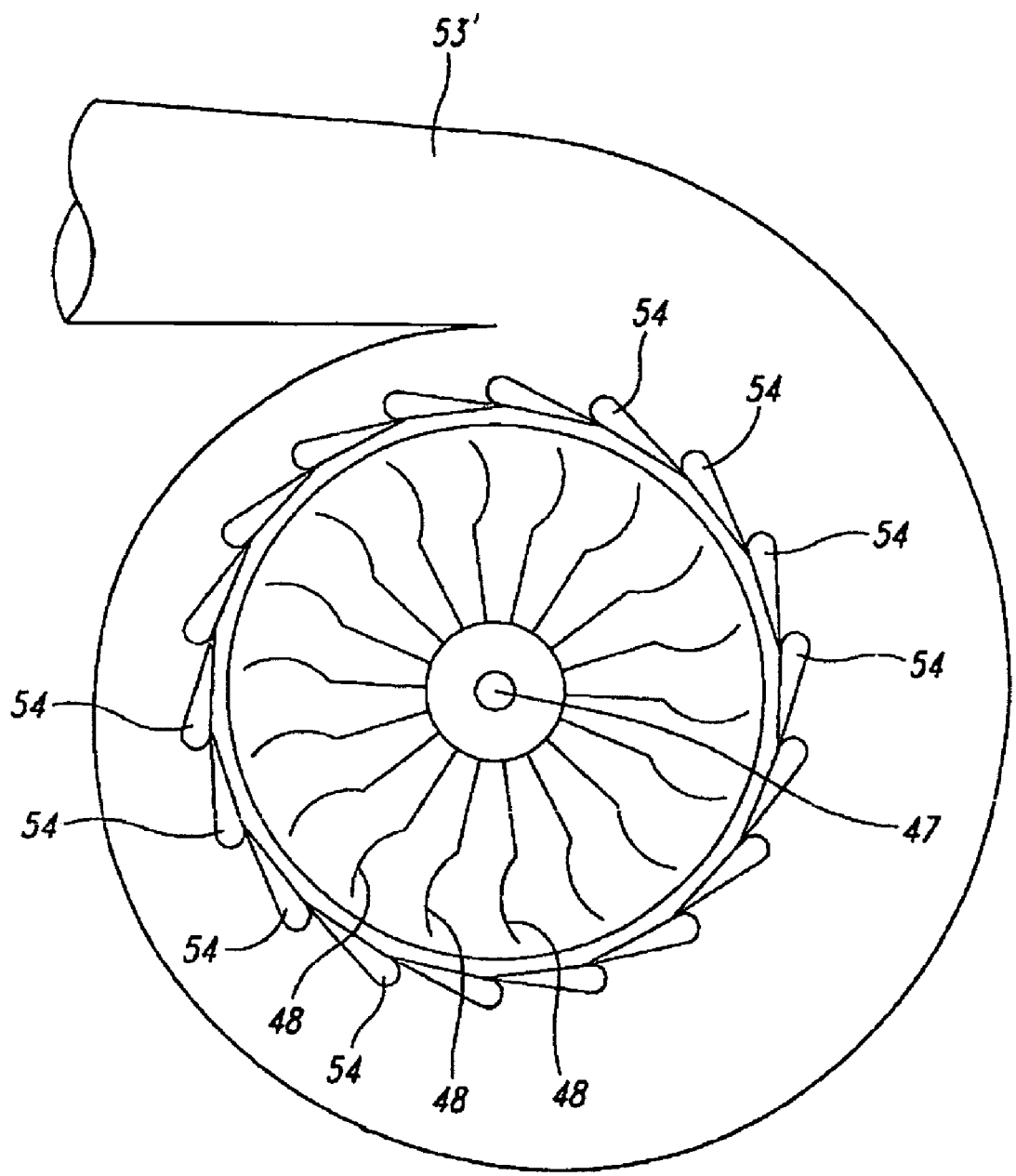
FIG. 6B provides another view of the FIG. 6A preferred variable geometry valve/nozzle means, but shown with the valve/nozzle means in a closed position.
Figure 6C:
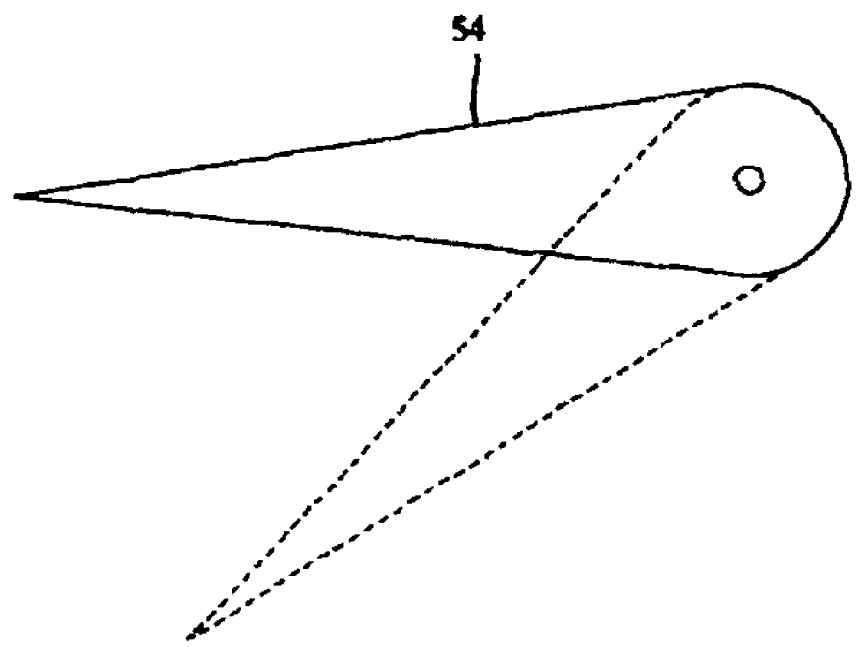
FIG. 6C presents a conventional rotating VGT vane, for use in a turbine.

There are various structures that may be utilized to serve the functions of valve/nozzle means 34 with the preferred variable geometry capability. In FIGS. 6A and 6B, as a preferred embodiment for use with a two-volute turbine 27' (or also for single volute turbine 56 of the two turbine arrangement in FIG. 12, discussed below), VGT vanes 54 surrounding the turbine wheel 47 function as the valve/nozzle means. FIG. 6C presents a larger view of a conventional VGT vane 54.

FIG. 6A illustrates the vanes 54 in an open orientation, allowing and guiding passage of bypassed exhaust flow 49 to the turbine blades 48, and additionally acting as variable geometry nozzles in accelerating the exhaust flow 49 into the turbine blades 48. In contrast, FIG. 6B shows the vanes 54 of FIG. 6A in a completely closed orientation (i.e. here, lined up "tail to nose" around the turbine wheel 47), thereby sealing and blocking any bypass exhaust flow through the volute 53' to the turbine blades 48. In this manner, the position of the VGT vanes 54 can operate fully as a regulating valve to open or shut off flow, and dictates the back pressure applied to the exhaust line 28 and/or exhaust manifold 21 in the system, and thus also controls the pressure drop allowed for the main exhaust flow through the high pressure turbine 25. This consequently provides flow control through the alternative exhaust paths, including proportional flow control, to extend the system's benefits and effectiveness over a wider range of engine speed and load operating conditions.

Figure 7A:
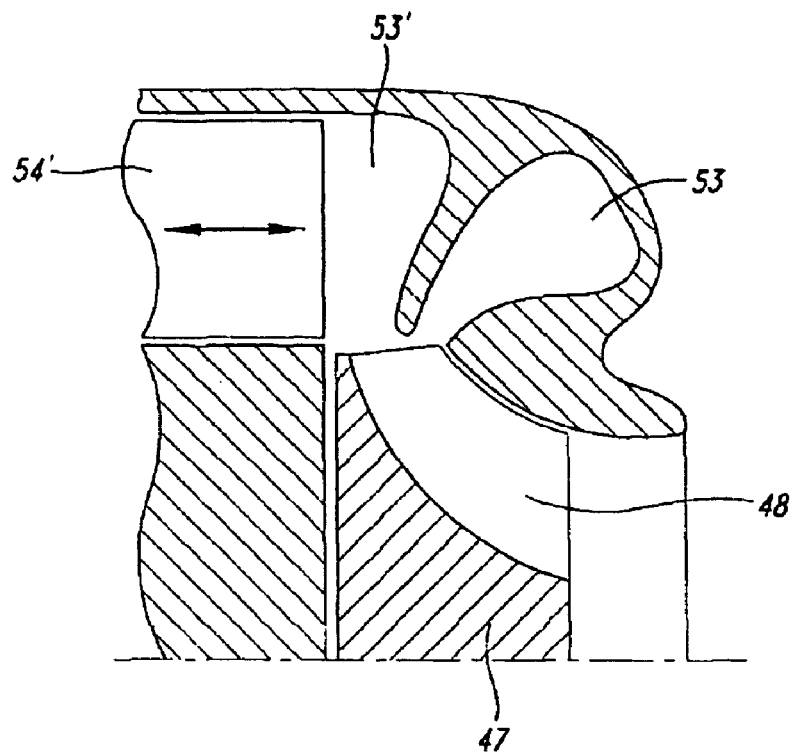
FIGS. 7A and 7B are sectional views of a two-volute turbine, showing an alternative variable geometry valve/nozzle means embodiment of the present invention for use in a second volute of a two-volute low pressure turbine.
Figure 7B:
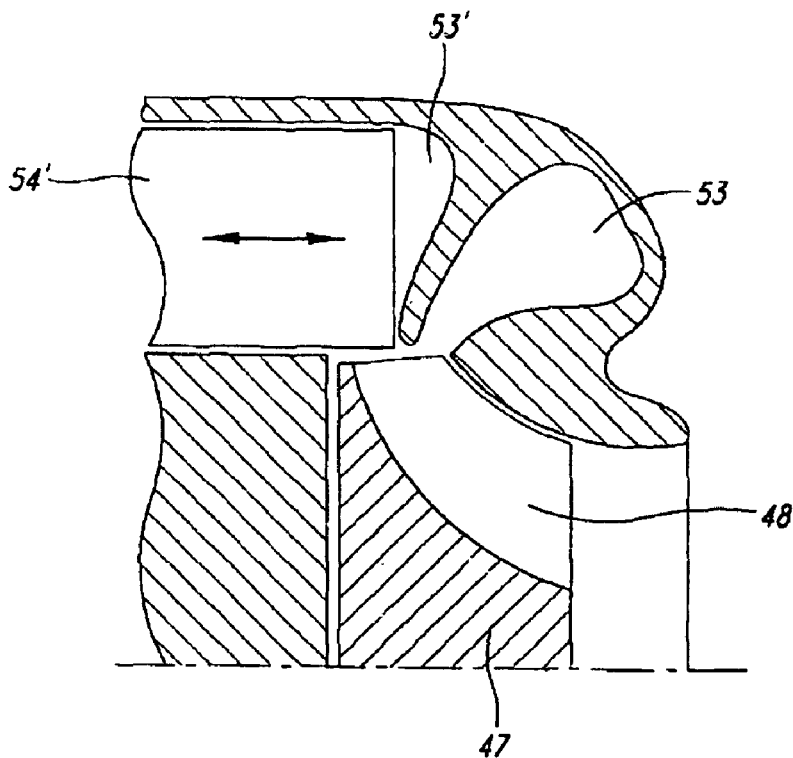
Figure 8:
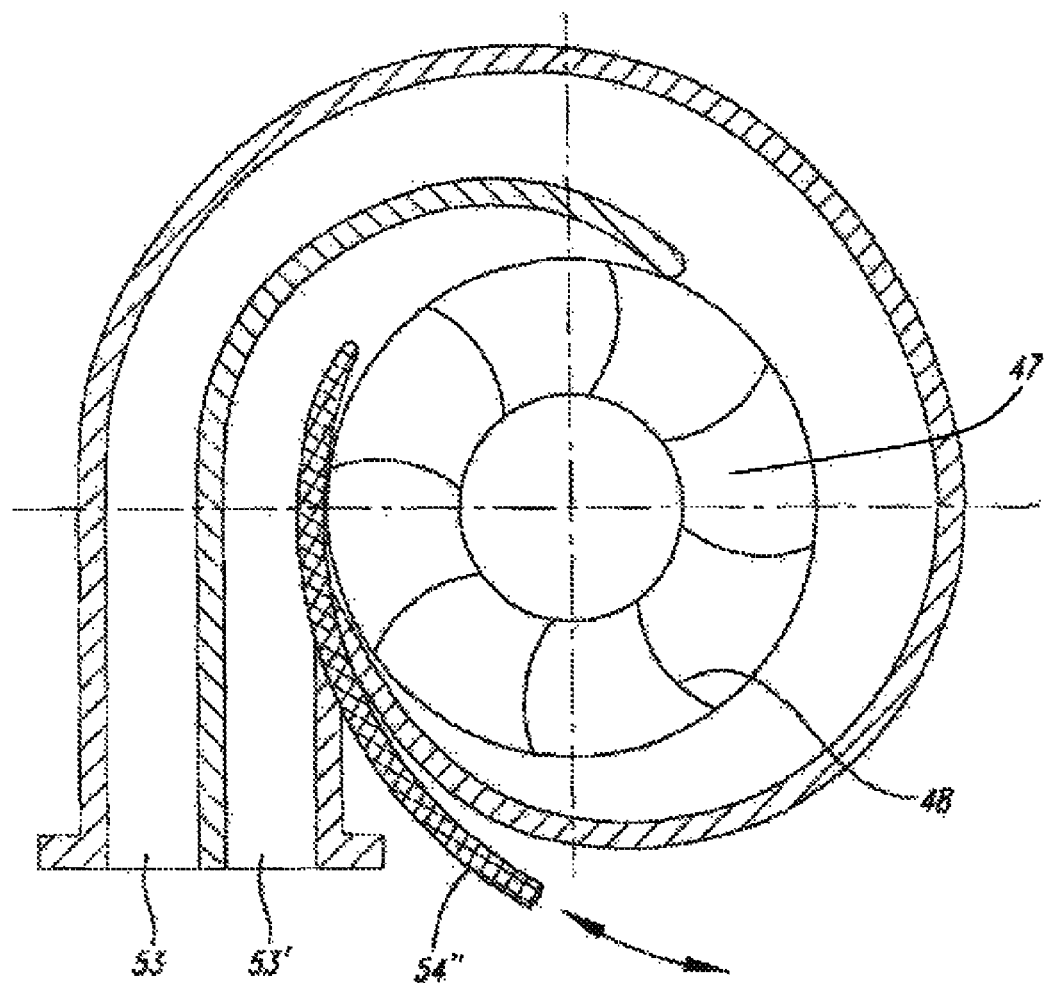
FIG. 8 is a sectional view of a two-volute turbine, showing a second alternative variable geometry valve/nozzle means embodiment of the present invention for use in a second volute of a two-volute low pressure turbine.

As an alternative to VGT vanes 54 for two-volute turbine 27', FIGS. 7A and 7B utilize a sliding plate mechanism 54' in volute 53' to perform the valve/nozzle function in regulating and accelerating the bypass flow in volute 53' to turbine blades 48. Likewise, FIG. 8 utilizes a sliding member/mechanism 54", as shown for a two-volute double flow turbine housing (wherein for this second example the two volutes are concentrically disposed with respect to the circumference of the turbine wheel 47, as opposed to being side-by-side with respect to the circumference of the turbine wheel 47).

Figure 6D:
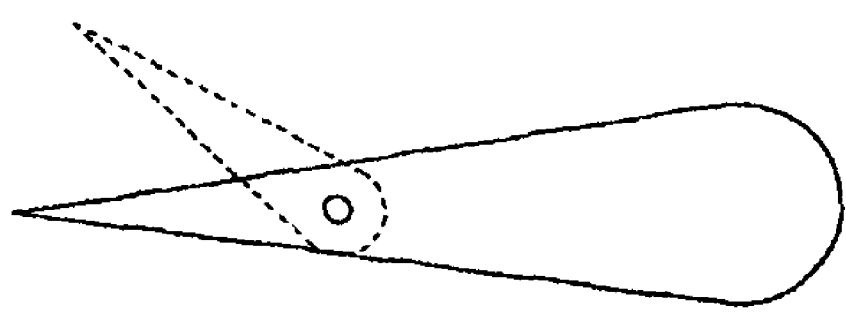
FIG. 6D presents an alternative VGT vane with an articulating trailing edge.
Figure 9A:
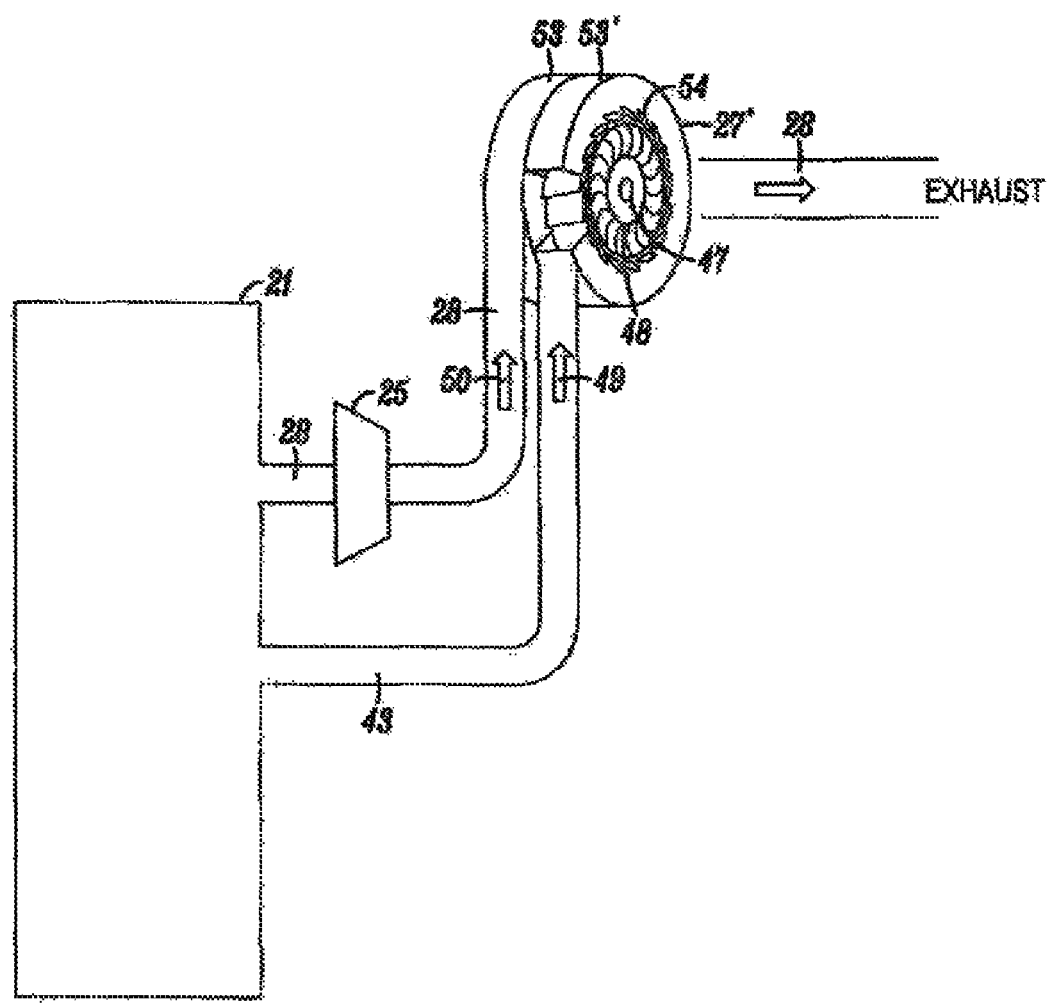
FIG. 9A illustrates the preferred internal combustion engine multi-stage turbocharging and bypass arrangement of the present invention, with a partially cut-away view of volute 53' in the invention.
Figure 9B:
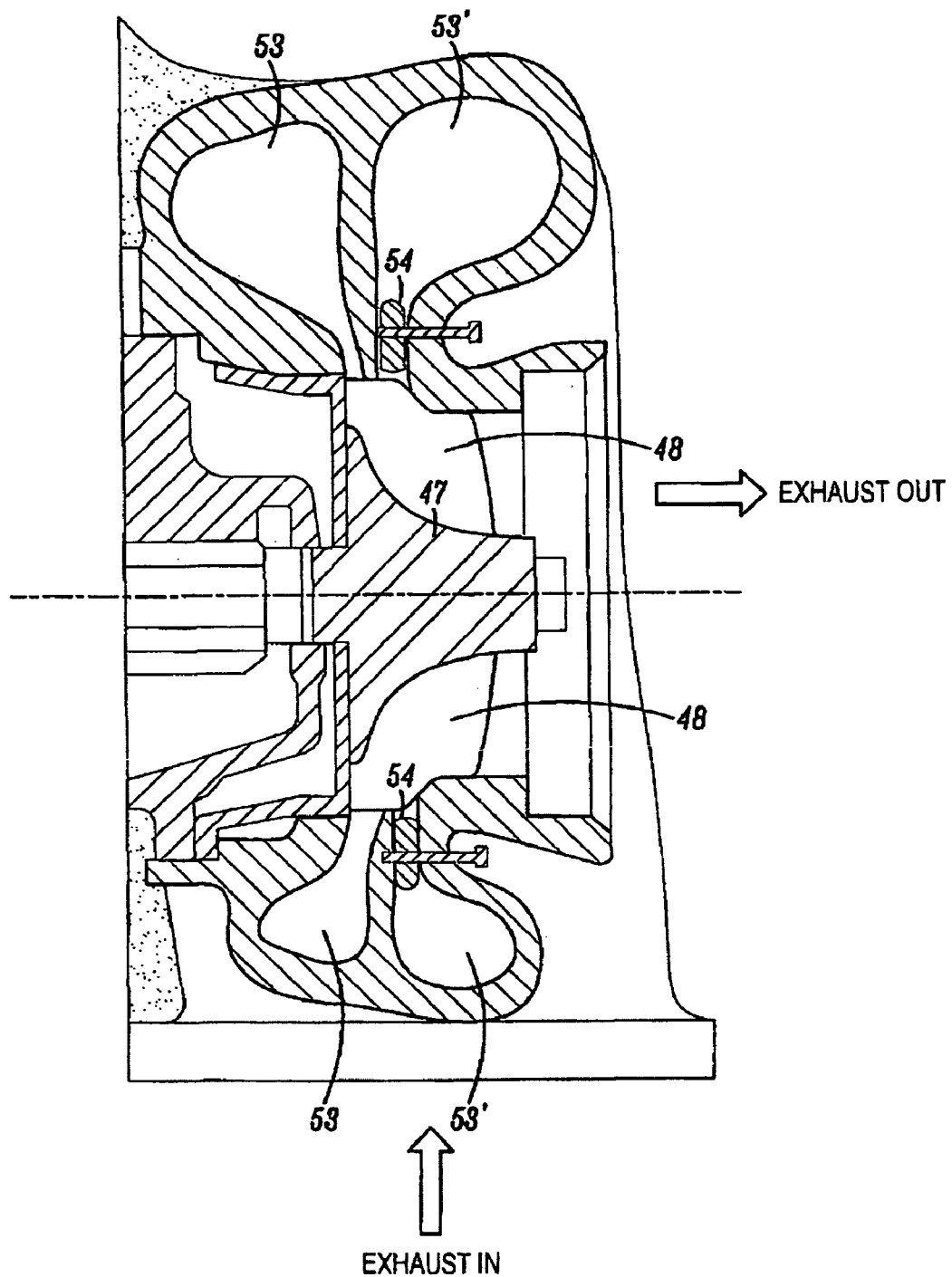
FIG. 9B illustrates the two volute turbine of the preferred embodiment of an internal combustion engine multi-stage turbocharging and bypass arrangement of the present invention.

FIGS. 9A and 9B now present the preferred embodiment of the multi-stage turbocharging system of the present invention. FIG. 9A is similar to the embodiment of FIG. 5, except as noted below. In the FIG. 9A preferred embodiment, valve/nozzle 34 is replaced by Variable Geometry Turbine (VGT) mechanism 54 in one volute, volute 53', of two-volute turbine 27'. The two volutes 53 and 53' are configured in a side-by-side orientation to each other with respect to their orientation around the circumference of the turbine wheel 47, as shown by the partial cut-away view in FIG. 9A, and as also more clearly shown in FIG. 9B and in FIG. 10. VGT mechanism 54 is presented herein in FIGS. 9A and 9B as conventional rotating adjustable vanes 54 (as also shown in FIGS. 6A-6C), but it will be understood that other VGT and/or other nozzle mechanisms may also be equivalently employed (e.g. a sliding nozzle mechanism as used by Cummins or in FIGS. 7A-7B and 8, or a vane with an articulating trailing edge (FIG. 6D), as a few examples) without departing from the scope of the invention.

As is known in the art, adjustable VGT vanes 54 act as nozzles to throttle exhaust gas and use the resulting restriction to create an accelerated, high velocity exhaust gas stream, and also to guide and direct that exhaust gas stream into the turbine wheel blades 48 (e.g., as is represented in FIG. 6A). Thus, in one embodiment, VGT mechanism 54 comprises conventional VGT vanes, which are rotating vanes arranged in a circle in the turbine volute 53', with the vanes able to rotate uniformly to form wider or narrower paths for the exhaust gas to the turbine blades 48. VGT mechanism(s) 54 are preferably placed closely adjacent the turbine blades 48 such that the kinetic energy of the bypassed exhaust flow passing by such vanes is fully preserved and not lost prior to the bypassed exhaust flow hitting turbine blades 48 at the optimal angle, as will be understood in the art. In contrast, second volute 53 of turbine 27' is preferably a fixed volute without a VGT mechanism 54, but may optionally use VGT as well, if desired. The flow from both volutes 53 and 53' target portion(s) of the turbine wheel blades 48 as desired, as for example shown in the sample embodiment of FIG. 9B.

Further referring to FIG. 9A, high pressure turbine 25 (presented simply in block form) is fluidly connected to exhaust manifold 21 by exhaust line 28. High pressure turbine 25 may optionally contain a VGT mechanism, if desired. Exhaust gas enters and leaves high pressure turbine 25 through an inlet and outlet in conventional manner (not shown), to continue in exhaust line 28 to volute 53 of low pressure turbine 27', where it is further expanded. The further expanded exhaust gas then leaves low pressure turbine 27' through an outlet in conventional manner (not shown), to continue in exhaust line 28 for exhaust gas recirculation or for release from the exhaust system. Bypass means/turbine inlet 43 of low pressure turbine 27' is also fluidly connected to exhaust manifold 21, allowing high pressure exhaust gas to bypass high pressure turbine 25 to volute 53' of low pressure turbine 27'. VGT mechanism 54, as discussed above, here shown as adjustable rotating VGT vanes as one embodiment, acts in volute 53' in place of a valve to regulate flow of bypassed exhaust gas flow 49 through volute 53', and also acts as a nozzle means to convert the exhaust energy in bypassed exhaust flow 49 to kinetic energy (velocity) to create accelerated bypass exhaust flow 51, and to guide or direct the accelerated bypass exhaust flow 51 to hit turbine blades 48 at an appropriate incidence angle (e.g., as shown in FIG. 6A) for spinning of turbine wheel 47. The placement of the VGT mechanism 54 near the turbine blades 48 allows the kinetic energy and increase in momentum of the bypassed exhaust flow to be preserved (by not allowing deceleration and expansion) for conversion to mechanical force at the turbine blades 48. The expanded exhaust gas from volute 53' then leaves low pressure turbine 27' through an outlet in conventional manner (not shown), to continue in exhaust line 28 for exhaust gas recirculation or for release from the exhaust system, as discussed above.

Figure 11:
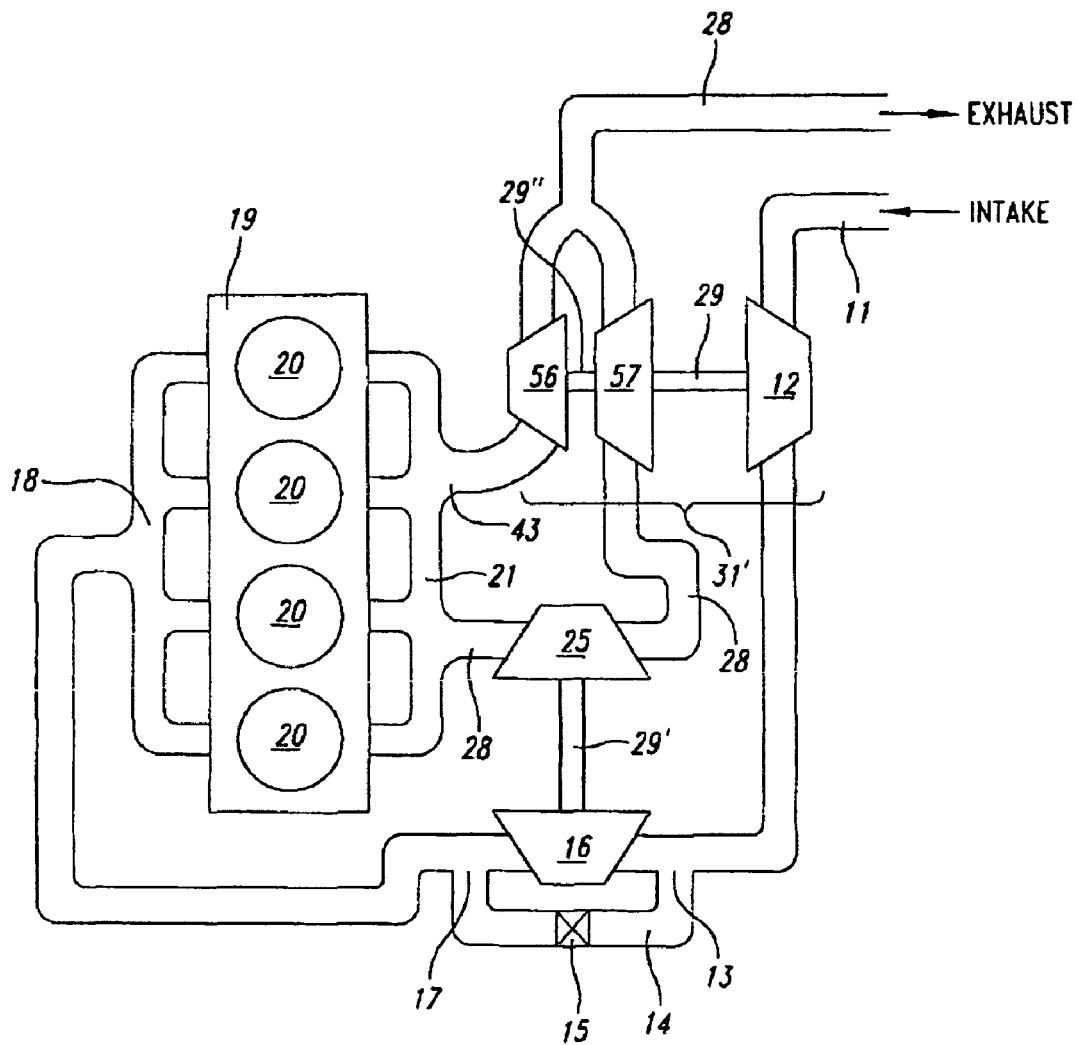
FIG. 11 is a schematic view of another alternative embodiment of an internal combustion engine system of the present invention, with two turbines on a common shaft.
Figure 12:
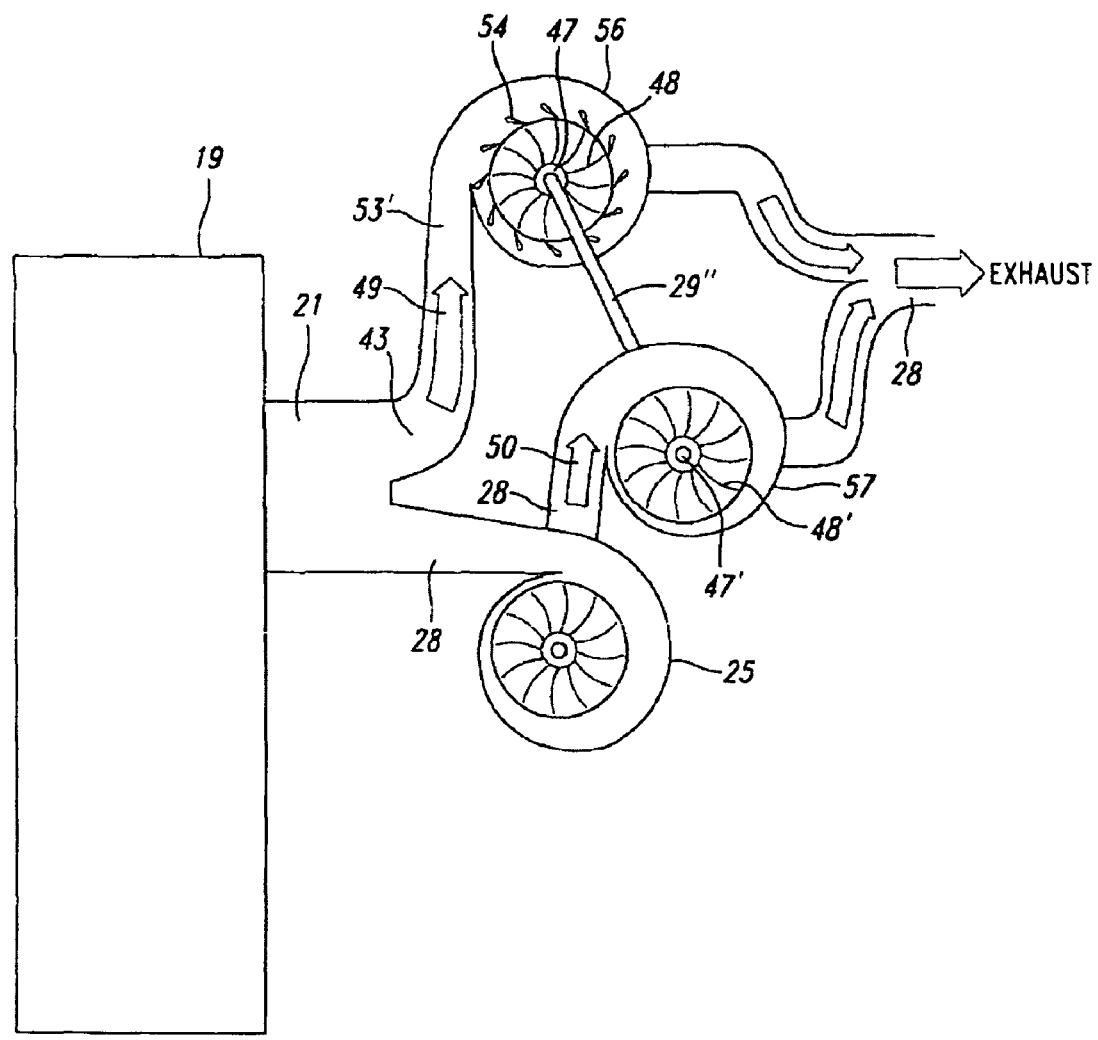
FIG. 12 is a more detailed view of the FIG. 11 two turbines on a common shaft turbocharging and bypass arrangement of the present invention.

FIG. 11 presents an alternative preferred embodiment of the engine system and turbocharging system of the present invention, similar to FIG. 5 and to FIGS. 9A and 9B, but comprising two low pressure turbines 56 and 57 on a common shaft 29" instead of a two-volute low pressure turbine 27'. Turbine 56 utilizes a VGT mechanism 54 in a configuration and manner similar to volute 53' from FIGS. 5 and 9A-9B, and receives bypass exhaust flow from bypass route 43 in one of the manners as previously described above. Turbine 57, on the other hand, preferably utilizes a fixed geometry, and receives exhaust gas from exhaust line 28 that has already passed through high pressure turbine 25, as also previously described above. Each low pressure turbine 56 and 57 includes a separate turbine wheel arrangement (identified as turbine wheels 47 and 47', and blades 48 and 48', as shown in FIG. 12), with the rotating wheels 47 and 47' connected by common rotating shaft 29", which is also part of shaft 29, which connects the two turbines 56 and 57 to compressor 12 (as shown in FIG. 11). The compressor 12, shaft 29 and 29", and two turbine arrangement 56 and 57 comprise turbocharger 31' in this embodiment.

After expansion in turbines 56 and 57 of FIG. 9, the exhaust gas flows that leave turbines 56 and 57 are thereafter combined downstream in exhaust line 28 (or within the two turbine turbocharger arrangement itself, in the alternative).

It will be understood from the foregoing that there are various other embodiments that could also be formed to achieve the novel objectives and methods of the inventions herein, and that such variations with equivalent functions and goals are also intended to fall within the scope of this patent. For example, the objectives of the inventions herein. may apply to multi-stage turbines for gas or fluid flows in other applications than in conjunction with internal combustion engine turbocharging systems. This patent is therefore intended to be limited solely by the claims, in the manner allowed by law.

I claim:

1. A two-volute turbine gas expander for a turbocharger, providing two paths for flow of a gas through the expander, comprising:

a first volute within the turbine gas expander, with a first turbine inlet respectively fluidly coupled thereto, wherein the first volute has a variable flow geometry; and a second volute within the turbine gas expander, with a second turbine inlet respectively fluidly coupled to said second volute and to an outlet of a higher pressure turbine gas expander to receive expanded gas from the higher pressure turbine gas expander, wherein the second volute has a fixed flow geometry.

2. The turbine gas expander of claim 1, wherein VGT vanes are rotatably mounted within the first volute to provide the variable flow geometry for the volute.

3. The turbine gas expander of claim 2, wherein the VGT vanes have an articulating trailing edge.

4. The turbine gas expander of claim 2, wherein the VGT vanes further provide proportional control of gas flow in the first volute.

5. The turbine gas expander of claim 4, wherein the VGT vanes are configured to selectively open or shut off the flow of gas through the first volute.

6. The turbine gas expander of claim 1, wherein a sliding mechanism is located within the first volute to provide the variable flow geometry for the volute.

7. The turbine gas expander of claim 6, wherein the sliding mechanism is configured to selectively open or shut off the flow of gas through the first volute.

8. The turbine gas expander of claim 7, wherein the sliding mechanism further provides proportional control of gas flow in the first volute.

9. The turbine gas expander of claim 1, wherein the first volute is a different size than the second volute.

10. The turbine gas expander of claim 1, wherein the first turbine inlet is configured to solely receive gas that bypasses the higher pressure turbine gas expander instead of passing through the higher pressure gas expander.

11. The turbine gas expander of claim 1 wherein the two paths provided by the first and second volutes are kept fully segregated upstream of a turbine wheel.

12. The turbine gas expander of claim 1, further comprising:
    a turbine wheel located within the turbine gas expander, configured to rotate as gas flows through the expander over blades of the turbine wheel; and
    a shaft rotatably driven by the turbine wheel and coupled to a gas intake charge compressor, wherein the shaft is configured to rotatably drive the compressor.

* * * * *